3 Sheets--Sheet 1.

R. T. P. ALLEN.
Type-Setting Machine.

No. 167,726.  Patented Sept. 14, 1875.

WITNESSES  
Franck L. Durand  
C. L. Everts.

INVENTOR  
R. T. P. Allen,  
By Alexander Mason  
Attorney

N. PETERS, PHOTO-LITHOGRAPHER, WASHINGTON, D.C.

3 Sheets--Sheet 2.

R. T. P. ALLEN.
Type-Setting Machine.

No. 167,726. Patented Sept. 14, 1875.

WITNESSES
F. L. Ourand
C. L. Evert

INVENTOR
R. T. P. Allen,
By Alexander T. Mason
Attorney

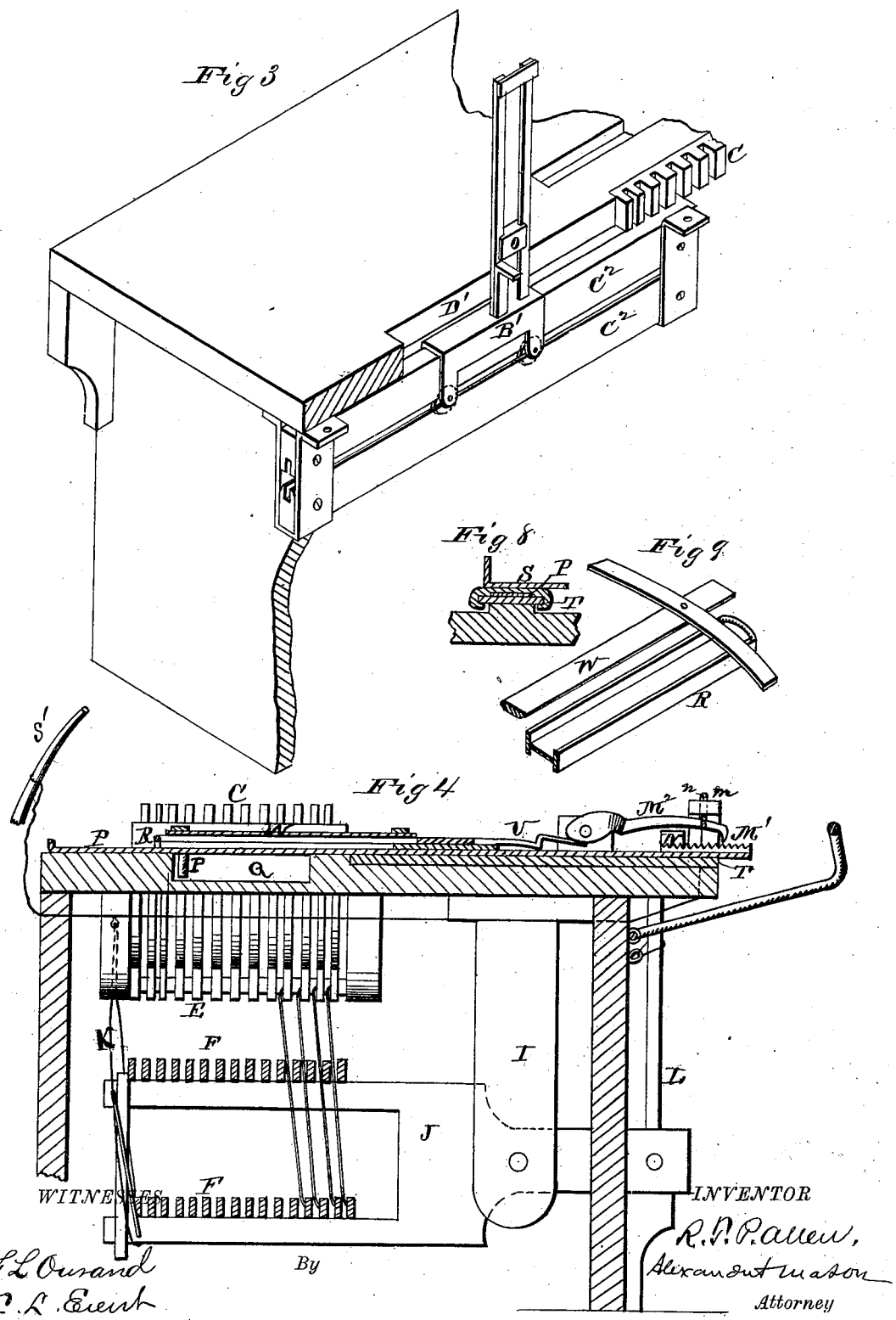

UNITED STATES PATENT OFFICE.

ROBERT T. P. ALLEN, OF FARMDALE, KENTUCKY.

IMPROVEMENT IN TYPE-SETTING MACHINES.

Specification forming part of Letters Patent No. 167,726, dated September 14, 1875; application filed July 26, 1875.

*To all whom it may concern:*

Be it known that I, ROBERT T. P. ALLEN, of Farmdale, in the county of Franklin and in the State of Kentucky, have invented certain new and useful Improvements in Type-Setting Machines; and do hereby declare that the following is a full, clear, and exact description thereof, reference being had to the accompanying drawings and to the letters of reference marked thereon, making a part of this specification.

This invention relates to certain improvements in type-setting apparatus; and it consists in a series of vertical type chambers or magazines arranged in two parallel rows upon a suitable table or frame, from which the desired type are ejected by means of a series of fingers connected with a key-board under the control of the operator, falling upon a type-stick between the two rows of magazines, over which a sliding shuttle is caused to traverse, by means of suitable machinery, at each ejection of a type, in such manner as to carry the type forward to the front end of the type-stick, at which point is arranged a lever of peculiar construction, by which the type, when sufficient in number, are removed or lifted at once and set into a form at one side of the type-stick, all of which will be fully hereinafter shown and described.

Figure 1:
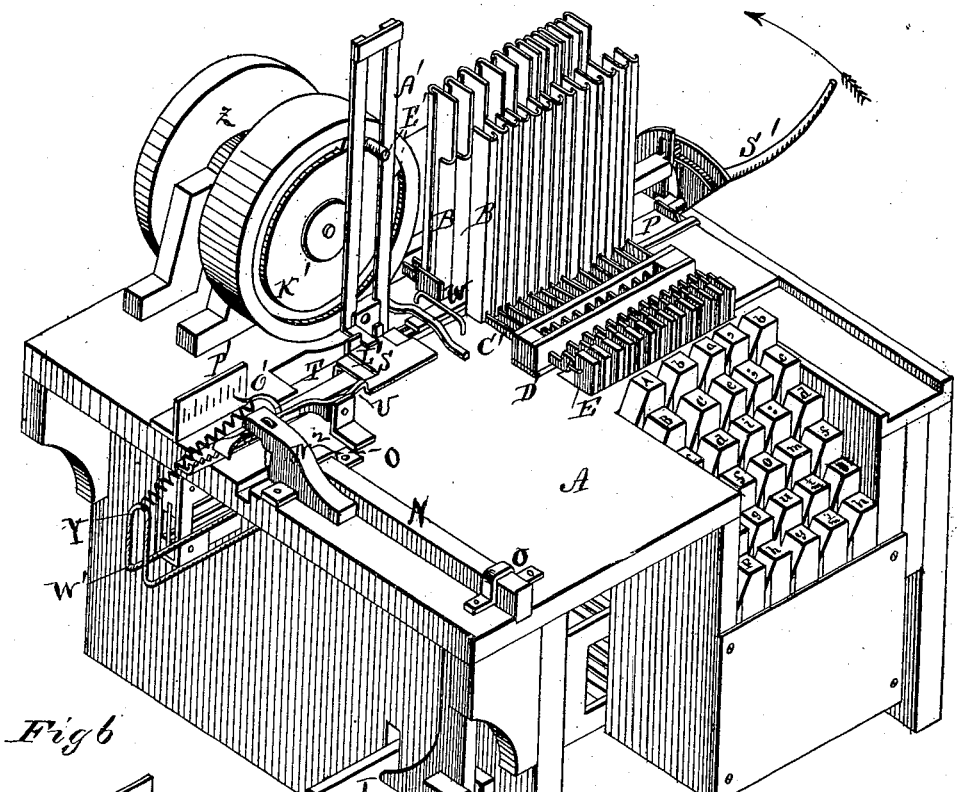
Figure 6:
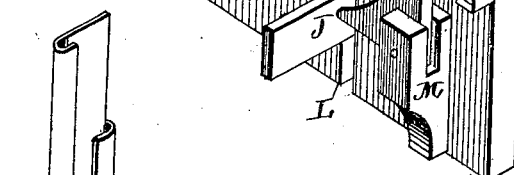
Figure 5:
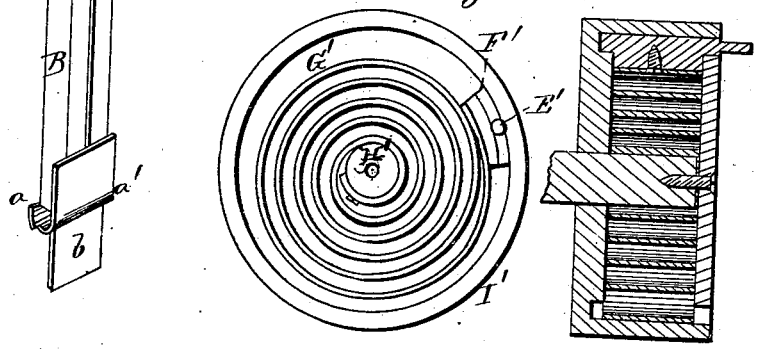
Figure 10:
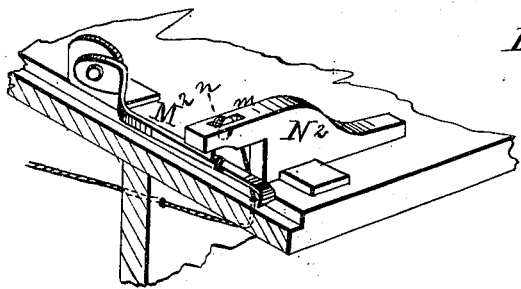
Figure 2:
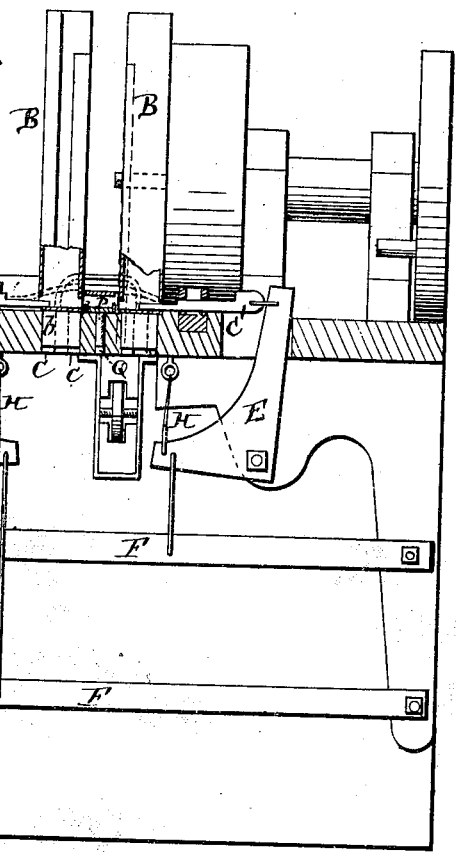
Figure 7:
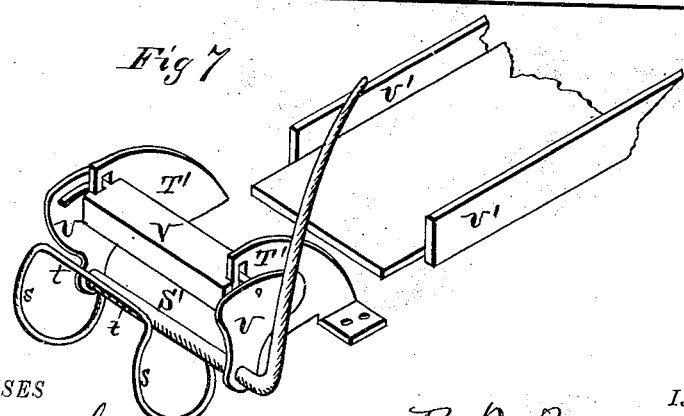

In the drawings, Figure 1 represents a perspective view of my improved apparatus; Fig. 2, a transverse vertical section through the apparatus; Fig. 3, a detached view, showing the mechanism by which the type-shuttle is operated; Fig. 4, a longitudinal sectional view of the apparatus; Fig. 5, a detached portion of the mechanism for operating the shuttle; Fig. 6, a detached view of one of the type magazines or chambers; Fig. 7, a detached view of the lever for lifting the type from the type-stick, and a portion of the form into which they are removed and set; Fig. 8, a detached sectional view of the carriage which carries the type-shuttle, and of the type-shuttle; and Fig. 9 a detached view of the type-shuttle and type-guard secured above the same. Fig. 10 represents a perspective view of the connecting-cord between the stick and its operating lever.

The letter A represents a frame or table of suitable material, which carries the various working parts of the apparatus. B B represent the type-magazines arranged vertically upon said frame or table in two parallel rows, said magazines being provided with projections $b\ b$ at their lower ends, which fit into the recesses or slots in two parallel bars, C C, secured to said table for the purpose of supporting the same, and allowing them to be readily removed and replaced. The magazines consist of rectangular metallic tubes, slotted on one side, and of an internal breadth equal to the length of a type and a width equal to the thickness of the same. A portion of the upper part of each tube is cut away, as shown in Fig. 6, to facilitate the charging or filling of the same with type. At the bottom of each tube, on opposite sides, are formed openings $a\ a'$, one for the admission of the finger by which the type is discharged, and the other for the egress of the type. A series of such fingers, corresponding in number with the type-magazines, are employed, the same being arranged at one side of each row of magazines, as indicated by the letters C' C' in the drawings. Said fingers are arranged in suitable guide-boxes D D, having a reciprocating motion therein, their front ends projecting into the openings in the lower ends of the type-magazines, and their rear ends connecting with a series of angle-levers, E E, corresponding in number, the said levers being pivoted at their angles below the table, and connected at their lower ends with a series of straight levers, F F, which project into the key-board and carry the keys G G at their outer ends. Said lower ends of the bent levers E E are also secured to springs H H attached to the table or frame, by which they are returned to their original positions when the keys are released. Below the key-board or front part of the table or frame A, and pivoted to a hanger, I, depending from the table or frame, is a bifurcated lever, J, the branches at one end of which set under the straight levers F F in such manner that when any one or more of the same are depressed said lever will be depressed at the same time, a spring, K, being secured to its end to return it to position when the lever or levers are released. The outer end of said lever J engages the lower end of an angle-lever, L, which is pivoted in a slotted block, M, secured to the frame or table A. The upper end of said lever engages a movable bolt or bar, N, secured to the top of the table or frame by metallic straps O, fastened over the same, and at each motion moves the said bar back and forth for the purpose to be hereinafter explained.

P represents the type-stick, consisting of a flat strip of metal of a width equal to the length of a type. Said stick is set between the two rows of magazines, upon a way, Q, being capable of a slight reciprocating motion thereon, its extent being limited by the pin P and slot Q, as shown in Fig. 2. Above said stick, and capable of a reciprocating motion thereon, is a type-shuttle, R, consisting of an open-bottomed frame, the rear end of which is secured to the reciprocating carriage S, arranged to travel upon a metallic plate, T, secured in the way Q. Said carriage has projecting from its rear a strip of metal, U, bent as shown, which forms a catch engaging under the bar N when the carriage is moved back with the shuttle, and holding the same until released by withdrawing the bar, which is automatically done at each depression of a key, as fully hereinbefore specified and explained.

W represents a shield extending over the shuttle and type-stick, being sufficiently elevated above the same to allow the type to pass under its edges when ejected from the magazines.

A' represents a slotted standard secured to a reciprocating carriage, B', mounted upon rollers confined between two parallel ways or guides, C', below the top of the table. Said standard projects upward through a slot, D', in the top of the table, to one side, and parallel with metallic plate T, upon which the carriage S travels. Through the slot in said standard projects a pin, E', secured to a segment, F', attached to the end of a spiral spring, G', secured to the shaft H' within the drum I', and projecting through an annular slot, K', in the head of the drum, in which it travels. Said standard is provided with a stud, L', in front, which engages the carriage S, and imparts a reciprocating motion to the same when the strip or projection is released from the bar N, as before described, reciprocating the shuttle back and forth over the type-stick. The rear end of the type-stick is provided with a ratchet, $M^1$, into which a pawl, $M^2$, attached to a standard, $N^1$, secured to the frame A, is arranged to drop by its own weight, and is also provided with a finger or pointer, O', which points to an index-plate, P', secured to the table, for the purpose hereinafter explained. S' represents a bent lever, journaled in the top of the table at the right-hand side, and provided with two circular arms, $s\ s$, extending under the type-stick, the upper ends of said arms being connected with a cross-piece, $t$, which is parallel with the edge of the type-stick, and projects slightly beyond it. Said lever S' has also attached to its opposite sides cams U U, which engage under the ends of a vertically-sliding gate, $v$, supported in slots between two upright standards, T' T', secured to the frame, behind which are arranged two parallel strips of metal, U' U', making a form, into which the type are transferred from the type-stick, as hereinafter explained. W' represents a standard attached to the left-hand side of the table, from which extends a spring, Y, to the pointer or finger O, secured to the rear end of the type-stick, and from the pawl $M^2$ proceeds a cord, $m$, over the pulley $n$ in the standard $N^2$, and over suitable pulleys below the table, to the opposite side of the same, where it is connected to the lever S'. Z represents a wheel provided with a crank, and secured to the shaft H' for the purpose of winding up the spring G'.

Having fully described the construction of my apparatus, I will proceed more fully to describe its operation.

The type-magazines are filled with the proper types, the lettered ends being toward the front of the apparatus. Upon depressing any particular key, its corresponding straight lever will be depressed, and, through the medium of the angle-lever with which it is connected, will cause its finger to enter or project into the opening in its type-magazine, and eject the requisite type upon the type-stick. At the same time the lever J will be depressed, operating the angle-lever L, and causing the same to draw back the bar N, releasing the projection U of the carriage S from the end of said bar. This allows the coiled spring G' to push forward the standard A', carrying the carriage S and type-shuttle forward until the type is forced against the upturned end of the shuttle-stick, where it is left on the return of the carriage and shuttle, as the spring continues to force the pin E around the annular slot K' until the projection U again catches under the bar N. This operation is repeated each time a key is depressed, and, as the types are deposited one against the other at the forward end of the stick, said stick is carried out by the types as they accumulate — the distance of one type at a time — until the proper number are collected, which is indicated by the pointer O' and index P', the stick being held at each successive step by means of the pawl $M^2$, which engages the ratchet thereon. When the proper number of types have been thus deposited at the end of the stick, they are transferred to the form U' by means of the lever S'. This is accomplished by turning the said lever in the direction indicated by the arrow. The cross-piece $t$ during its passage will take hold of the ends of the type, gradually lifting said type into an inclined position, the opposite ends resting against the gate V. This is gradually raised by the cams U U as the types are elevated, and finally allows the whole to drop in an upright position into the form U'. In elevating the lever S the cord $m$, connected with the pawl $M^2$, causes the said pawl to be lifted from the ratchet, which allows the spring Y to return the stick to its original position ready for another row of types.

Having fully described the construction and operation of my invention, what I claim, and desire to secure by Letters Patent of the United States, is—

1. The combination, with the key-levers of a type-setting machine, of the levers J and L, bar N, shuttle-carriage S, standard A', and spring G, all substantially as and for the purposes herein set forth.

2. The combination, substantially as hereinbefore described, of the type-stick P, type-shuttle R, carriage S, and standard A', and spring G', arranged to operate in the manner and for the purposes set forth.

3. In combination with the type-stick P and shuttle R, arranged to operate as described, the lever S' and gate V, for the purpose of transferring the type to the form, substantially as herein set forth and shown.

4. In combination with the type-stick, provided with a ratchet at its rear end, the pawl $M^2$, cord $n$, and lever S', arranged to operate as herein described and shown.

5. In combination with the type-stick, ratchet and pawl and lever S', the spring Y, secured to the standard W' and pointer O', for the purpose of returning the type-stick to its original position after the type have been transferred to their type-form, substantially as herein set forth and described.

6. In combination with the sliding type-stick and sliding type-pusher, the type-shield W, for the purpose of retaining the type in place upon the type-stick, substantially as [herein set forth and described.

In testimony that I claim the foregoing I have hereunto set my hand this 1st day of April, 1875.

ROBERT T. P. ALLEN.

Witnesses:
J. T. ORBISON,
HUGH RODMAN.